(12) United States Patent
Wasserman et al.

(10) Patent No.: US 9,587,203 B2
(45) Date of Patent: Mar. 7, 2017

(54) METHODS FOR EXTRACTING SOLUTE FROM A SOURCE MATERIAL

(71) Applicants: Jason Wasserman, Portland, OR (US);
Jess Ordower, Portland, OR (US);
Samual Decker, Portland, OR (US)

(72) Inventors: Jason Wasserman, Portland, OR (US);
Jess Ordower, Portland, OR (US);
Samual Decker, Portland, OR (US)

( * ) Notice: Subject to any disclaimer, the term of this patent is extended or adjusted under 35 U.S.C. 154(b) by 0 days.

(21) Appl. No.: 14/834,872

(22) Filed: Aug. 25, 2015

(65) Prior Publication Data
US 2015/0361376 A1 Dec. 17, 2015

Related U.S. Application Data

(63) Continuation-in-part of application No. 14/070,972, filed on Nov. 4, 2013, now Pat. No. 9,145,532.

(51) Int. Cl.
*C11B 1/10* (2006.01)
*B01D 11/02* (2006.01)
*C11B 9/02* (2006.01)

(52) U.S. Cl.
CPC ............ *C11B 1/10* (2013.01); *A23L 27/11* (2016.08); *B01D 11/02* (2013.01); *C11B 9/025* (2013.01)

(58) Field of Classification Search
None
See application file for complete search history.

(56) References Cited

U.S. PATENT DOCUMENTS

| | | | | |
|---|---|---|---|---|
| 5,281,732 A | * | 1/1994 | Franke | A23C 19/06 554/11 |
| 5,516,923 A | * | 5/1996 | Hebert | C11B 1/10 554/11 |
| 6,551,642 B2 | * | 4/2003 | Trout | C11B 1/10 210/509 |
| 6,821,413 B1 | * | 11/2004 | Alkhalidl | C10M 175/00 208/179 |

* cited by examiner

*Primary Examiner* — Yate K Cutliff
(74) *Attorney, Agent, or Firm* — Mohr Intellectual Property Law Solutions, PC

(57) ABSTRACT

Methods for extracting solute from a source material are shown and described. The methods each include: depositing the source material in a canister, introducing a solvent, exposing the source material to the solvent to create an extract mixture, communicating the extract mixture to one or more extract containers, separating the solute from the extract mixture by heating the extract containers, collecting the recycled solvent in a solvent collection container, and cooling the recycled solvent within the solvent collection container. In some examples, the one or more extract containers are first and second extract containers that are each selectively coupleable to the canister and are selectively removable for storage of the extract mixture. In some other examples, cooling the recycled solvent within the solvent collection container is carried out via a cooling mechanism coupled to the solvent storage container.

20 Claims, 12 Drawing Sheets

METHODS FOR EXTRACTING SOLUTE FROM A SOURCE MATERIAL

CROSS REFERENCE TO RELATED APPLICATIONS

This application claims priority to and is a continuation-in-part of copending U.S. patent application Ser. No. 14/070,972, filed on Nov. 4, 2013, which is hereby incorporated by reference for all purposes.

BACKGROUND

The present disclosure relates generally to systems for extracting solute from source materials. In particular, systems configured to extract essential oils from solid materials are described.

Known extraction systems are not entirely satisfactory for the range of applications in which they are employed. For example, many conventional systems are unable to simultaneously extract solute from materials stored in a plurality of distinct containers. Rather, many existing systems are configured to extract solute from a single container of source material.

Extracting solute from a single container produces a bottleneck, requiring the user to wait for extraction to complete before the user can perform any other task associated with the extraction process. As a result, conventional systems require a wasteful, inefficient extraction methodology. Accordingly, there exists the need for a system that provides parallelism to overcome such bottlenecks.

Further, many conventional extraction systems do not allow extraction to be performed in a single, closed loop process that reclaims solvent and re-introduces the reclaimed solvent in subsequent cycles of the system. While some conventional systems allow users to manually reclaim and reuse solvent, this process is time consuming and results in an inefficient reclaim rate.

Further, many systems include no means for reclaiming previously used solvent. Because users are unable to reclaim and reuse solvent, such systems are wasteful. Further, many solvents include odorants and other impurities that may end up in extracted materials. Because the reclamation process may simultaneously purify previously used solvent, systems lacking reclamation functionality may produce a lower quality end product. Accordingly, there exists the need for a system that defines a closed loop with an at least partially automated means for reclaiming and reintroducing solvent used in previous iterations of extracting solute from a source material.

Additionally or alternatively, there exists a need for cooling reclaimed solvent to a liquid state prior to collecting the solvent. Liquid solvent may be more efficiently stored than solvent that is presently a gas. As a result, cooling reclaimed solvent to a liquid state prior to collecting it allows users to more efficiently store reclaimed solvent. Accordingly, there exists a need for extraction systems that cool reclaimed solvent prior to collecting it.

Thus, there exists a need for extraction systems that improve upon and advance the design of known systems. Examples of new and useful extraction systems relevant to the needs existing in the field are discussed below.

SUMMARY

The present disclosure is directed to methods for extracting solute from a source material. The methods each include: depositing the source material in a canister, introducing a solvent into the canister, exposing the source material to the solvent to create an extract mixture, fluidly communicating the extract mixture to one or more extract containers, separating the solute from the extract mixture by heating the one or more extract containers, collecting die recycled solvent in a solvent collection container, and cooling the recycled solvent within the solvent collection container. In some examples, the one or more extract containers are first and second extract containers that are each selectively coupleable to the canister and are selectively removable for storage of the extract mixture or the solute. In some other examples, cooling the recycled solvent within the solvent collection container is carried out via a cooling mechanism coupled to the solvent storage container.

DETAILED DESCRIPTION

The disclosed systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various systems are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
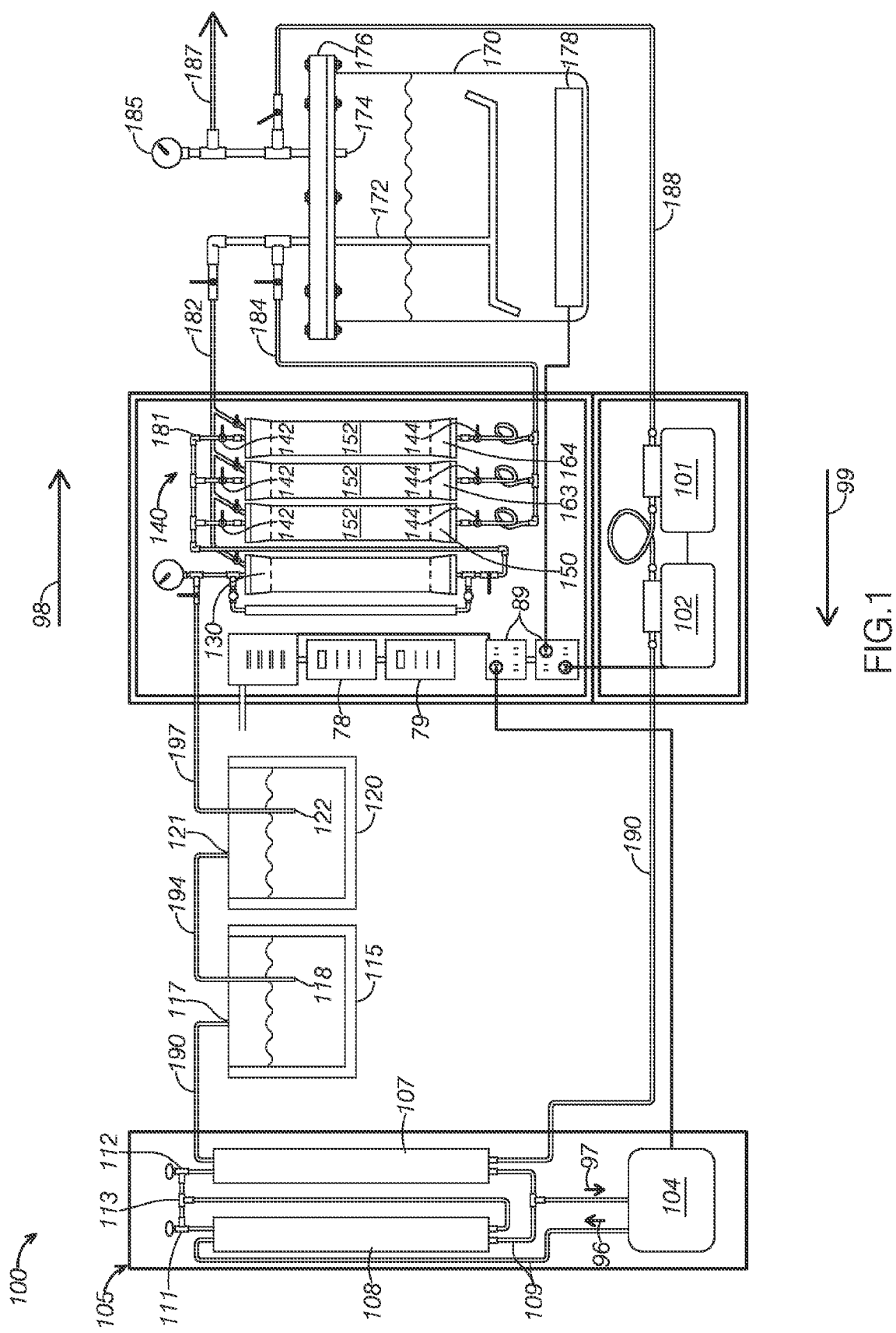
FIG. 1 is a schematic view of a first example of a system for extracting solute from a source material.

With reference to FIGS. 1-5, a first example of a system for extracting solute from a source material, system 100, will now be described. As FIG. 1 shows, system 100 includes a solvent source container 120, a solvent compressor 130, a detachable canister system 140, an extract container 170, a first pump 101, a second pump 102, a condensing system 105, and a solvent collection container 115. System 100 additionally includes various valves and fluid lines (defining pipes) that control the flow of fluids through system 100 during operation.

Figure 2:
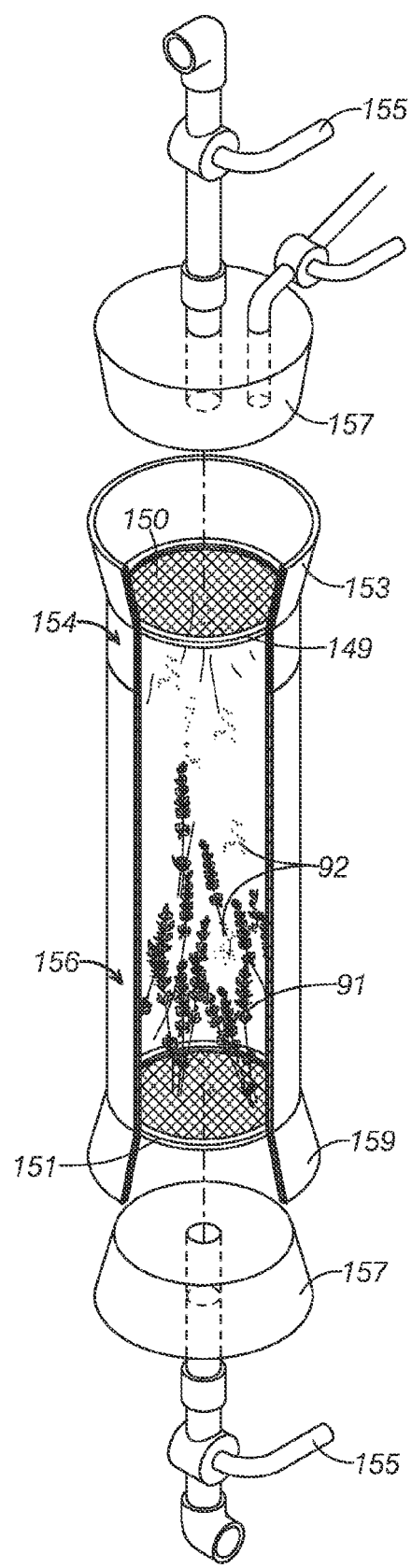
FIG. 2 is a perspective cutaway view of an example of a detachable canister included in the system shown in FIG. 1.

System 100 may be particularly adapted for using butane to extract essential oils from plant material. For example, FIG. 2 depicts system 100 using butane to extract essential oils from lavender plants. FIG. 2 illustrates lavender 91 contained within first detachable canister 150, being exposed to a solvent, defining liquid butane 92, within a canister of system 100.

As FIG. 2 shows, first detachable canister 150 is configured to store lavender 91 and liquid butane 92 to extract the essential oils from the source material in an extract solution, containing butane and lavender essential oil. After a predetermined period of time selected to effectively extracting essential oil from lavender plant materials, first detachable canister 150 is configured to output the contained extract solution.

After the predetermined period of time, the extract solution is directed to an extract container. The extract container is configured to heat the contained extract solution above the boiling point of the solvent to separate substantially purified post-extraction solvent from the extract solution. The evaporated post-extraction solvent is then stored to reclaim it for later use. After removing the post-extraction solvent from the extract container, the residual material in the extract container defines a distilled, high-purity essential oil of the source material.

After the solvent has been used to extract solute from the solvent, system 100 is configured to reclaim the used solvent for later use. As FIG. 1 illustrates, extract container 170 is connected in fluid communication with solvent collection container 115. Extract container 170 is configured to separate the solvent from the extracted solute, allowing system 100 to direct and collect the used solvent in solvent collection container 115. System 100 includes several features configured to increase the reclaim rate of post-extraction solvent, allowing system 100 to use solvent more efficiently than many conventional extraction systems.

As FIG. 1 shows, solvent source container 120 is connected in fluid communication with solvent compressor 130 and in fluid communication with solvent collection container 115. As FIG. 1 illustrates, solvent source container 120 includes a source container input 121 and a source container output 122. Source container input 121 is configured to fluidly receive solvent communicated from solvent collection container 115. For example, first pump 101 and second pump 102 may pump solvent contained in solvent collection container 115 as system 100 proceeds through an extraction cycle. Source container input 121 is additionally configured to restrict the passage of fluid back into solvent collection container 115.

Source container output 122 is configured to direct solvent contained in solvent source container 120 to solvent compressor 130 via a solvent source line 197. By directing fluid to solvent compressor 130, solvent source container 120 introduces the solvent in the current cycle of system 100's extraction process. In some examples, solvent source line 197 may include an internal filter. The internal filter may be used to remove impurities in solvent prior to introducing the solvent to detachable canister system 140.

Because solvent source container 120 is configured to fluidly receive solvent from solvent collection container 115, solvent source container 120 may be refilled with post-extraction solvent collected by solvent collection container 115 during previous extraction cycles performed by system 100.

By directly reintroducing post-extraction solvent to solvent source container 120, system 100 is able to reclaim post-extraction solvent at a high rate. Further, the reclaimed solvent may be of a higher purity than fresh, commercially sourced butane. Butane often ships with an odorant, such as mercaptan or thiphiane. When using a solvent containing such an odorant, the extracted essential oil may include portions of the odorant. This results in a less desirable end product.

In some examples, solvent source line 197 may include a solvent filter within its fluid-transmissive interior, thereby passing solvent through the filter as it passes from solvent source container 120 to solvent compressor 130. In some examples, the solvent filter may define a 13-X molecular sieve configured for membrane filtration of the solvent as it passes from solvent source container 120 to solvent compressor 130.

Post-extraction solvent that has been processed and reclaimed by system 100 may have decreased levels of odorant compared to commercially available odorant-containing solvents. Accordingly, using reclaimed solvent may result in a purer, more desirable end product. In some cases, users may run a solvent purification cycle prior to extraction to remove such impurities. Such a solvent purification cycle may include processing and reclaiming commercially purchased butane through system 100 one time prior to extraction.

As FIG. 1 shows, solvent compressor 130 is in fluid communication with solvent source container 120. As FIG. 1 additionally illustrates, solvent compressor 130 is in fluid communication with first pump 101 and second pump 102, assuming appropriate valves are open. Solvent compressor 130 is configured to receive solvent from solvent source container 120.

Solvent compressor 130 is configured to compress, or "charge," the received solvent. In some examples, the compressor may be electrically powered, such as by plugging into an electrical outlet 89. In other examples, solvent compressor 130 may pressurize solvent using backflow pressure produced by first pump 101 and second pump 102.

In some examples, it is desirable to use a high temperature, liquid solvent for extraction. Solvent compressor 130 may be used to compress solvent to an extraction pressure, the extraction pressure selected to maintain solvent in a liquid state even when exposed to an elevated extraction temperature. After pressurizing the solvent, solvent compressor 130 is configured to introduce the pressurized solvent into detachable canister system 140.

As FIG. 1 shows, detachable canister system 140 is connected in fluid communication with solvent compressor 130. As FIG. 1 illustrates, detachable canister system 140 includes a plurality of detachable canisters, including a first detachable canister 150, a second detachable canister 163, and a third detachable canister 164. Detachable canister system 140 is configured to direct solvent from solvent compressor 130 to each detachable canister via a detachable canister line 181.

Detachable canister system 140 is configured to fluidly receive compressed solvent from solvent compressor 130. Detachable canister system 140 is further configured to direct to extract container 170 extract solution produced within attached canisters, the extract solution including both solvent and solute extracted from source materials contained in the canisters. Detachable canister system 140 is further configured to direct to extract container 170 any overflow solvent output by solvent compressor 130 and not received by a detachable canister.

As FIG. 1 illustrates, detachable canister system 140 is configured to direct fluid from solvent compressor 130 to each detachable canister. As FIG. 1 shows, detachable canister system 140 includes an input valve associated with each detachable canister. Each input valve controls fluid communication between solvent compressor 130 and the associated detachable canister. When an input valve is opened, solvent compressor 130 is configured to communicate contained compressed solvent to the associated canister.

As FIG. 1 shows, solvent compressor 130 is configured to communicate with each detachable canister individually. Accordingly, detachable canister system 140 allows a user to refill a selected canister as one or more of the other canisters remain closed and to continue extracting solute from contained source material.

As FIG. 1 shows, detachable canister system 140 is configured to direct the extract solution created in each detachable canister to extract container 170 via an extract mixture line 184. As FIG. 1 shows, detachable canister system 140 includes an output valve associated with each detachable canister. When an output valve is opened, the associated canister is placed in fluid communication with extract mixture line 184.

When placed in fluid communication, the associated canister is configured to output an extract mixture to extract container 170 via extract mixture line 184. A user may use the output valves to direct the extract mixture contained in an associated canister to extract container 170. In some examples, first pump 101 and second pump 102 are configured to cooperatively suck the extract mixture from the associated canister toward extract container 170.

As FIG. 1 illustrates, detachable canister system 140 additionally includes an overflow line 182 in fluid communication with solvent compressor 130, each detachable canister, and extract container 170. Overflow line 182 is configured to direct overflow solvent that does not make it from solvent compressor 130 to one of the detachable containers after charging. For example, overflow line 182 may be used to collect solvent trapped in detachable canister line 181 after filling one of the detachable canisters with solvent.

FIG. 2 illustrates an example detachable canister, first detachable canister 150, filled with solvent and source material. In FIG. 2, first detachable canister 150 is currently extracting solute from the source material. As FIG. 2 illustrates, first detachable canister 150 includes a top portion 154, which may be screwingly attached to and detached from a bottom portion 156. When top portion 154 and bottom portion 156 are attached, they define a fluid-tight container configured to store solvent and source material during extraction.

As FIG. 2 shows, first detachable canister 150 may additionally or alternatively include a top mesh filter 149 and a bottom mesh filter 151. As FIG. 2 shows, top mesh filter 149 defines a perimetral gasket surrounding a mesh filter. The perimetral gasket is made of a food-grade nitrile, allowing first detachable canister 150 to be legally used to extract solute that may be used for food products. As FIG. 2 illustrates, top mesh filter 149 is configured to be slidingly inserted into the top of first detachable canister 150 to prevent sediment from inadvertently backflowing through the input of first detachable canister 150. The perimetral gasket is sized to partially compress within first detachable canister 150, thus frictionally supporting top mesh filter 149 in a substantially fixed position within first detachable canister 150.

In some examples, the filter of top filter 149 may define a stainless steel 200 mesh filter. In some examples, the gasket portion of top filter 149 may define fox grade nitrile.

Bottom mesh filter 151 is substantially similar to top mesh filter 149, but is positioned proximate the bottom of first detachable canister 150. Accordingly, bottom mesh filter 151 is configured to prevent sediment from inadvertently flowing through the output of first detachable canister 150.

Because system 100 includes multiple canisters and each canister is removable, system 100 is able to extract solute in the connected, filled containers as other functions of system 100 continue to operate. For example, when one canister is attached and extracting, solvent compressor 130 may charge solvent for a second canister. Further, a user may be able to load a detached canister as solvent compressor 130 charges solvent, providing even greater parallelism.

As FIG. 2 shows, detachable canister system 140 includes, for each detachable canister, both an upper canister attachment device 153 and a lower canister attachment device 159. Each upper canister attachment device 153 and lower canister attachment device 159 is configured to selectively secure the associated detachable canister. As shown in FIG. 2, each upper canister attachment device 153 device includes a handle 155, which defines an over-center securing lever configured to be pulled to lock upper canister attachment device 153 in a substantially fixed position over the top opening of the associated canister. As FIG. 2 shows, each upper canister attachment device additionally defines a compressible, fluid tight gasket 157 configured to be compressed against the associated canister when upper canister attachment device 153 is locked in a closed configuration. As FIG. 2 shows, upper canister attachment device 153 may be pulled away and spaced from the associated canister when handle 155 being released.

As FIG. 2 shows, lower canister attachment device 159 is configured to slidingly receive the lower opening of an associated canister. As FIG. 2 illustrates, lower canister attachment device 159 includes a compressible, fluid tight gasket 157. As FIG. 2 illustrates, a user may manipulate upper canister attachment device 153 to receive the associated canister such that the canister is engaged with both gaskets 157. When a user pulls handle 155 to position upper canister attachment device 153 in a locked configuration, the both gaskets 157 are configured to compress to place the canister in fluid communication with both solvent compressor 130 and extract container 170. Similarly, both gaskets are configured to release when handle 155 is released. When handle 155 is released and upper canister attachment device 153 is pulled away from the associated canister, the canister can be slidingly removed from lower canister attachment device 159 to be removed from system 100.

As FIG. 1 illustrates, each detachable canister includes a heating pad 152 wrapped around its exterior. Each heating pad 152 is configured to receive electrical energy, such as by being plugged into electrical outlet 89, to heat the canister around which it is wrapped. Increasing the temperature can, in many cases, increase solvents' efficacy and efficiency in extracting solute from a source material. The heating pads may be controlled by an electronic heating pad controller 78, which configures the heating pad to operate at a chosen temperature or intensity.

Figure 4:
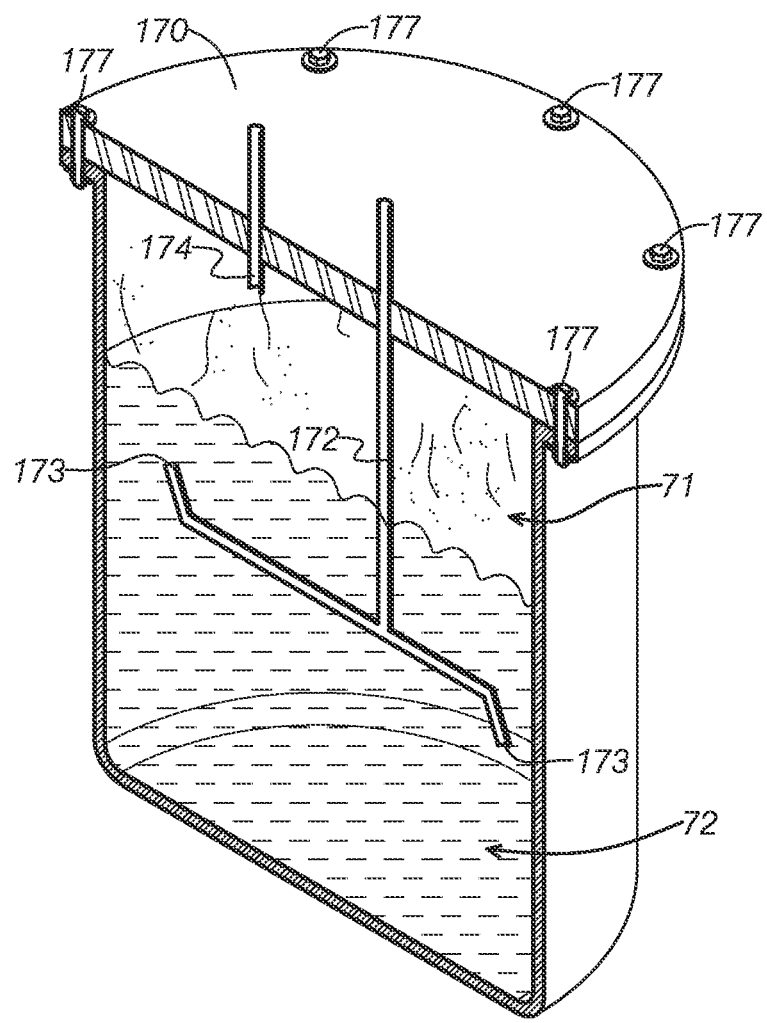
FIG. 4 is a cross-sectional view of the extract container shown in FIG. 3 taken along the line 4-4.

As FIG. 1 shows, extract container 170 is in fluid communication with detachable canister system 140, configured to receive extract solution output by the detachable canisters and any overflow solvent transmitted by overflow line 182. As FIG. 4 illustrates, extract container 170 includes a container input 172, a container output 174, and a lid 176. Extract container 170 is configured to receive the extract mixture output by the detachable canisters. Extract container 170 is further configured to separate post-extraction solvent from the extract mixture and output the post-extraction solvent for reclamation.

Container input 172 is configured to receive extract mixture in a liquid state from the detachable canisters. For example, FIG. 4 illustrates extract container 170 containing a liquid 72 containing both extract mixture and extracted essential oil. The extract mixture has been collected from detachable canister system 140 in the current cycle of system 100, whereas the extracted essential oil is the residual essential oil after reclaiming post-extraction solvent from a previous cycle of system 100.

As FIG. 4 shows, system 100 includes features that are configured to restrict fluid from passing back into detachable canister system 140. As FIG. 4 shows, container input 172 is positioned below the midpoint of extract container 170. At this point, container input 172 will often be positioned below collected essential oils. Because container input 172 is often positioned within collected liquid, extract container 170 directs gas, such as evaporated post-extraction solvent 71, toward container output 174 rather than the submerged container input 172.

Further, container input 172 includes angled open ends 173. The open ends 173 prevent liquid from being directed toward lid 176. By preventing liquid from contacting lid 176, extract container 170 provides a substantially clear view of the liquid contained in extract container 170. Further pump 102 and pump 104 are configured to direct fluid toward container output 174 and away from container input 172.

As FIG. 4 shows, container output 174 is configured to direct gas, such as evaporated post-extraction solvent 71, from extract container 170 to solvent collection container 115. As FIG. 4 illustrates, container output 174 is positioned above container input 172 and above the top of fluid collected in extract container 170. Because container output 174 is located in this elevated position, it is positioned to receive gas from extract container 170 as fluid remains in extract container 170. Because container output 174 is positioned to primarily receive gas from extract container 170, extract container 170 is configured to separate evaporated post-extraction solvent from extract mixture while leaving the extracted essential oils in extract container 170. This results in a pure product while reclaiming post-extraction solvent at a high rate.

Extract container 170 defines a pressure pot, configured to retain its structure at a wide range of pressure profiles. Namely, extract container 170 is configured to maintain its structure from −30 mmHg of vacuum pressure to 300 pounds per square inch of positive pressure. In typical working conditions, the amount of pressure applied to container 170 will range from −30 mmHg of vacuum pressure to 150 pounds per square inch of positive pressure. In particular, extract container 170 will often be between −30 to 0 mmHg of vacuum when receiving fluid from extract mixture line 184 and between 0 and 60 pounds per square inch of pressure when directing fluid to container output 174.

Figure 3:
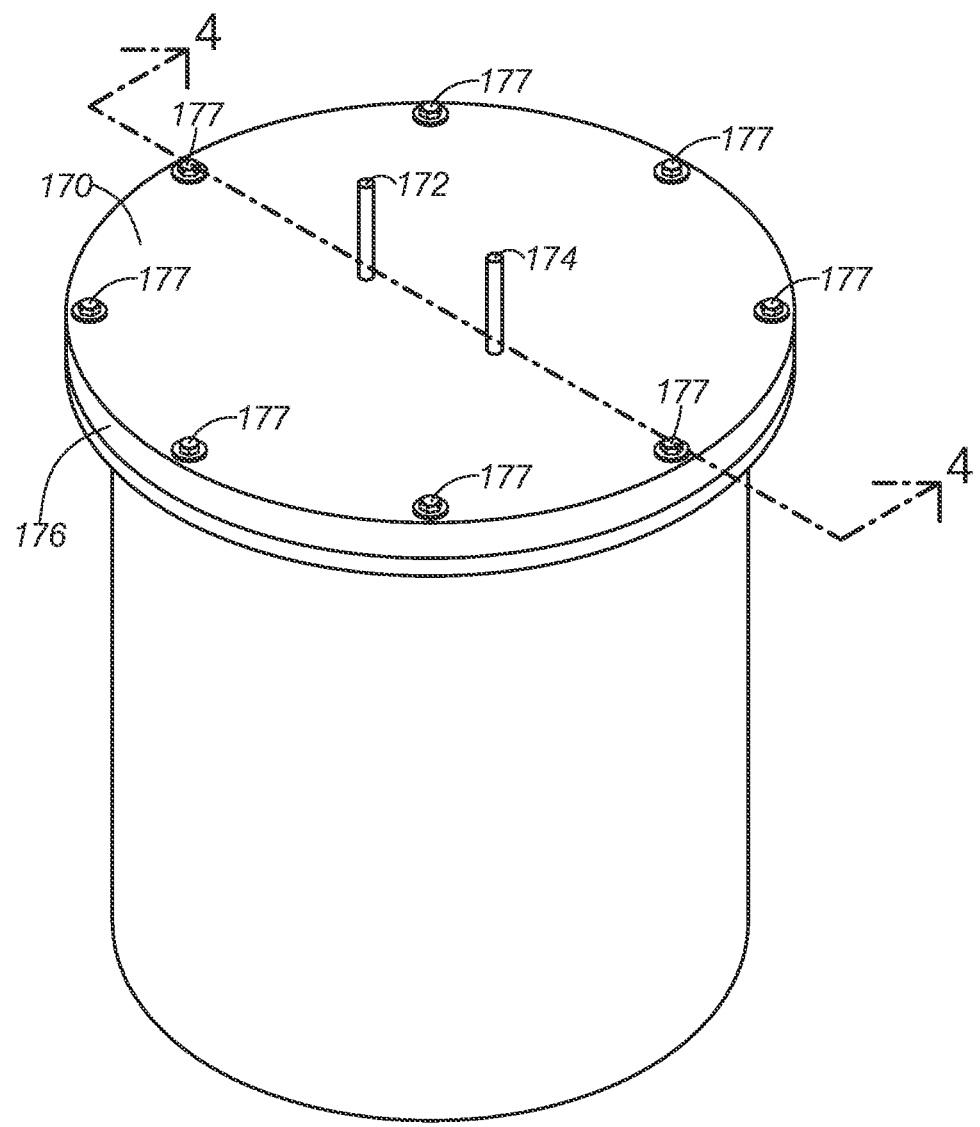
FIG. 3 is a perspective view an extract container included in the system shown in FIG. 1.

As FIGS. 3 and 4 show, lid 176 is detachably secured to the top of extract container 170. Lid 176 allows a user to view the contents within container 170 and is made from plexiglass. The thick Plexiglas construction of lid 176 provides sufficient rigidity and structural integrity to withstand the widely disparate pressure conditions often present in extract container 170. The lid may be made from any material configured to withstand anticipated operating pressures.

As FIGS. 3 and 4 show, lid 176 is fastened to the main body of container 170 by a series of 0.5 inch bolts 177. The bolts are each detachable, allowing lid 176 to be selectively removed. Further, the numerosity and strength of the bolts provide sufficient structural support to restrict lid 176 from being damaged or unintentionally removed under the pressure conditions typically encountered during operation.

As FIG. 3 shows, lid 176 includes ports through with container output 174 and container input 172 are spaced at a distance selected to retain structural integrity of lid 176 under the pressure conditions typically encountered during operation.

As FIG. 1 illustrates, an extract container heating element 178 is thermally coupled with the contents of extract container 170, being positioned at the bottom of extract container 170. Heating element 178 defines an electrically powered heating pad rated at 500 Watts. Heating pad 152 is configured to heat the extract mixture to a distilling temperature to produce an evaporated portion of the solvent in extract container 170. The distilling temperature to which extract container 170 is heated is greater than the boiling point of butane and less than typical essential oil boiling points.

Heating element 178 may be powered by an electrical connection to electrical outlet 89. Additionally, the temperature or intensity of heating element 178 may be controlled by an electronic container heating element controller 79.

As FIG. 1 illustrates, system 100 includes a pressure release valve 185 and pressure release line 187, both in fluid communication with container output 174. Pressure release line 187 is in fluid communication with ambient air at a location in which it is safe to output flammable fluids. During operation, the pressure of the interior of extract container 170 may fall outside the bounds of desirable operating pressures. For example, pressure release valve 185 is configured to open pressure release line 187 upon extract container 170 exceeding 150 pounds per square inch of positive pressure or negative 30 pounds per square inch of vacuum pressure.

As FIG. 1 illustrates, first pump 101 and second pump 102 are connected in fluid communication with extract container 170. First pump 101 and second pump 102 are configured to direct fluid through system 100 in the direction indicated by arrows 98 and 99 shown in FIG. 1. For example, first pump 101 and second pump 102 are configured to cooperate to direct evaporated post-extraction solvent from extract container 170 to solvent collection container 115 over a container output line 188 and a solvent collection line 190. In some examples, a fan may be attached between first pump 101 and second pump 102 for cooling when system 100 is operational.

Because system 100 defines a closed loop system, first pump 101 and second pump 102 are cooperatively configured to direct fluid at a variety of stages of system 100 as long as any intervening valves are opened. For example, first pump 101 and second pump 102 may be configured to cooperate to draw solvent from solvent collection container 115 to solvent source container 120. Further, first pump 101 and second pump 102 are configured to cooperatively communicate at least a portion of post-extraction solvent evaporated within extract container 170 to solvent collection container 115.

Similarly, first pump 101 and second pump 102 may be configured to cooperatively direct extract solution output from the detachable canisters to extract container 170. In some examples, backflow pressure produced by first pump 101 and second pump 102 provide some or all of the pressure used by solvent compressor 130 to pressurize solvent prior to introducing it to the solvent containers.

First pump 101 and second pump 102 collectively produce a flow rate sufficient to accomplish each of the aforementioned functionalities. Some examples include more or fewer pumps connected in series. Additional pumps may provide additional pumping power, whereas fewer pumps may save on operating costs.

As FIG. 1 shows, solvent collection line 190 is configured to pass through condensing system 105 between second pump 102 and solvent collection container 115. As FIG. 1 illustrates, condensing system 105 includes a coolant pump 104, a first condenser column 107, a second condenser column 108, a coolant line 109, a coolant loop line 113, a first expansion valve 111, and a second expansion valve 112. Condensing system 105 is configured to cool post-extraction solvent pumped by first pump 101 and second pump 102 prior to the solvent reaching solvent collection container 115. By cooling the post-extraction solvent, condensing system 105 allows the post-extraction solvent to be stored and collected as a liquid.

Coolant line 109 includes a coolant defining a refrigerant selected to cool when evaporated. As FIG. 1 illustrates, coolant pump 104 is configured to direct the coolant contained in coolant line 109 in the direction indicated by arrow 96 and arrow 97.

As FIG. 1 illustrates, coolant line 109 is routed through second condenser column 108. After passing through second condenser column 108, coolant line 109 splits, with one branch being directed back to coolant pump 104 and the other branch being directed toward first condenser column 107. As FIG. 1 shows, coolant line 109 joins coolant loop line 113 in fluid communication after passing through second expansion valve 112.

Coolant line 109 is configured to absorb heat from the post-extraction solvent passing through solvent collection line 190 to cool the post-extraction solvent to a liquid state. Coolant line 109 and coolant loop line 113 additionally cooperate to continuously cool coolant pump 104 during operation.

Figure 5:
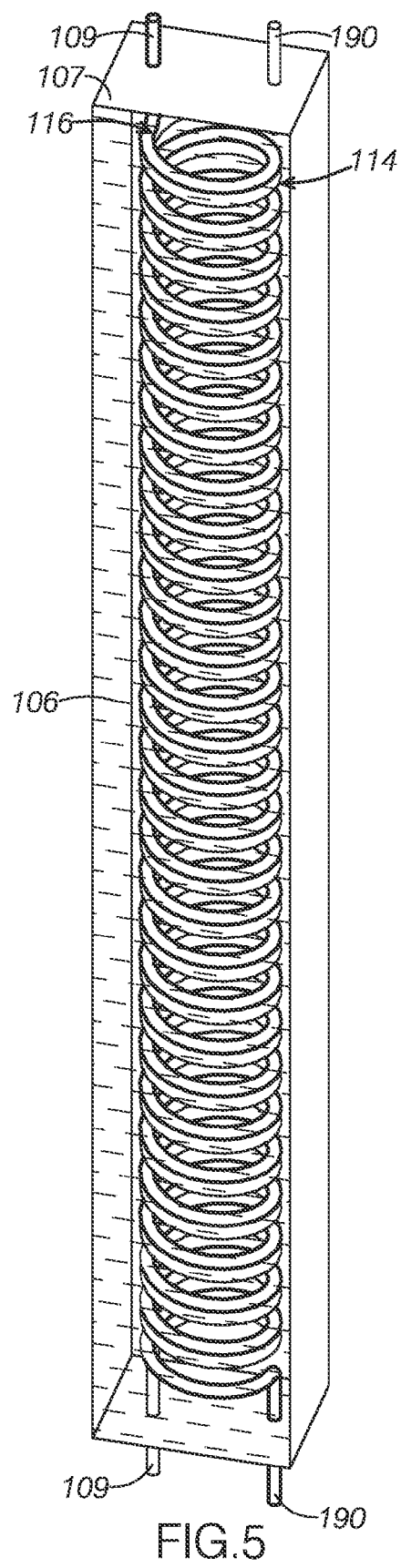
FIG. 5 is a perspective view of a condenser column shown included in the system shown in FIG. 1, the condenser column shown with a front panel removed to show interior details.

As FIG. 5 illustrates, solvent collection line 190 defines a coiled portion 114 through first condenser column 107. Likewise, coolant line 109 defines a coiled portion 116 through first condenser column 107. As FIG. 5 shows, coiled portion 116 and coiled portion 114 are sufficiently close with one another for coolant line 109 and solvent collection line 190 to be thermally coupled through first condenser column 107. As FIG. 5 shows, first condenser column 107 is filled with a thermally conductive liquid 106, such as an antifreeze, which encourages rapid heat transfer between coolant line 109 and solvent collection line 190.

As FIG. 1 shows, coolant line 109 is connected in fluid communication with coolant loop line 113. Coolant loop line 113 is routed through second condenser column 108 and defines a coiled portion through second condenser column 108. Similar to the design of first condenser column 107, the coiled portion of coolant loop line 113 and a second coiled portion of coolant line 109 are engaged and thermally coupled with one another within second condenser column 108.

As FIG. 1 shows, the hydraulic circuit defined by coolant line 109 and coolant loop line 113 routes coolant pumped by coolant pump 104 through two expansion valves. Coolant passing through first expansion valve 111 in second condenser column 108 expands to vapor or a vapor/liquid mix, which draws heat from the second coiled portion of coolant line 109. This cools coolant line 109, particularly at its second portion. As FIG. 1 shows, a portion of this cooled coolant is reintroduced into coolant pump 104, thereby continuously cooling coolant pump 104 during operation.

Coolant passing through second expansion valve 112 as it returns to coolant pump 104 similarly expands to a vapor or vapor/liquid mix, which draws heat from solvent collection line 190 and the solvent passing therein. In many cases, second expansion valve 112 will expand coolant returning from coolant line 109, which draws heat from solvent collection line 190. This cools the post-extraction solvent passing through solvent collection line 190 to a liquid. Cooling the solvent and shifting it to a liquid decreases losses of recaptured post-extraction solvent and increases the efficiency of solvent collection container 115 in storing previously used solvent, thus increasing the recapture rate of system 100.

The coiling of fluid lines through both first condenser column 107 and second condenser column 108 increases the surface area throughout which the corresponding lines are thermally coupled. By maximizing this surface area, first condenser column 107 and second condenser column 108 are better able to transfer heat between the two paired lines. Further, the coiling of the lines increases the amount of time in which contained fluids are exposed to one another, further increasing the columns' cooling efficiency.

As FIG. 1 illustrates, solvent collection container 115 is connected in fluid communication with extract container 170 through solvent collection container 115 and solvent source container 120 via a storage container line 194. As FIG. 1 shows, solvent collection container 115 includes a collection container input 117 and a collection container output 118. Solvent collection container 115 is configured to collect post-extraction solvent separated from the distilled solute within extract container 170 and directed through solvent collection line 190.

Solvent collection container 115 is configured to direct collected solvent to solvent source container 120 upon collecting a maximum amount of collected solvent. In some configurations, solvent collection container 115 is configured to communicate collected solvent upon exceeding its storage capacity. In other examples, solvent collection container 115 is configured to communicate collected solvent upon the collected solvent reaching the end of collection container output 118. When the collected solvent reaches the second storage unit output, the suction force produced by first pump 101 and second pump 102 draws collected solvent through the second storage unit output to refill solvent source container 120.

Solvent collection container 115, solvent source container 120, and extract container 170 define volumes that are operatively paired with one another. Extract container 170, solvent source container 120, and solvent collection container 115 may, at times of operation, be configured to receive all of the fluid from the preceding fluidly connected elements. Accordingly, solvent collection container 115 and solvent source container 120 are sized to ensure sufficient storage space for any post-extraction solvent output by extract container 170.

To ensure sufficient headroom, the combined volume of solvent source container 120 and solvent collection container 115 may be equal to the volume of extract container 170. Likewise, extract container 170 may define a volume equal to the combined volume of solvent source container 120 and solvent collection container 115 to provide sufficient headroom to be filled with all of the solvent initially contained by solvent collection container 115 and solvent source container 120. In some examples, one or more of solvent source container 120, solvent collection container 115, and extract container 170 may be sized larger than needed, which may guarantee sufficient headroom.

Although solvent collection container 115 and solvent source container 120 are distinct containers in system 100, this disclosure contemplates that a single container could serve as both a solvent collection container and solvent source container.

Figure 6:
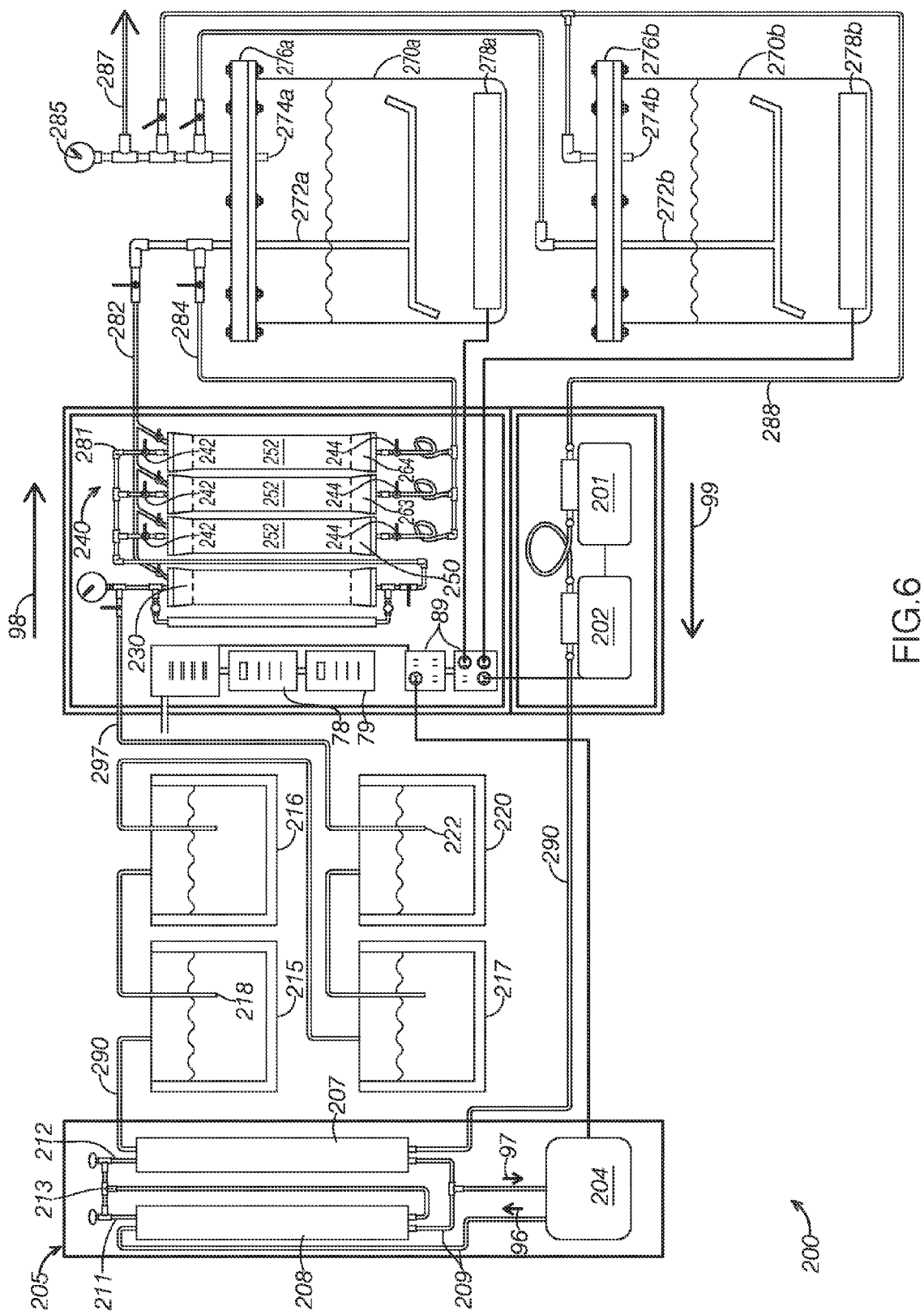
FIG. 6 is a schematic view of a second example of a system for extracting solute from a source material.

Turning attention to FIG. 6, a second example of a system for extracting solute from a source material, system 200, will now be described. System 200 includes many similar or identical features to system 100. Thus, for the sake of brevity, each feature of system 200 will not be redundantly explained. Rather, key distinctions between system 200 and system 100 will be described in detail and the reader should reference the discussion above for features substantially similar between the two systems.

As FIG. 6 shows, some example systems for extracting solute from a source material may include more than one extract container. For example, system 200 includes both a first extract container 270a and a second extract container 270b. It will be appreciated that second extract container 270b has a substantially similar configuration to first extract container 270a, and each of extract containers 270a and 270b have a substantially similar configuration to extract container 170 (i.e., having a container inputs 272a and 272b, a container outputs 274a and 274b, a lids 276a and 276b, and a heating elements 278a and 278b).

In this example, second extract container 270b is coupled to output line 288 downstream of first extract container 270a and is in fluid communication with first extract container 270a. In other words, first extract container 270a is coupled to detachable canister system 240 via overflow line 282 for collection of overflow solvent and extract mixture line 284 for collection of the extract mixture, while second extract container 270b is coupled to first extraction container 270a for collection of the extract mixture. Further, in this example, overflow line 282 and extract mixture line 284 are both single pathway lines. Alternatively, the second extract container can be in coupled directly to the detachable canister system, as shown and described in FIGS. 8 and 9.

As FIG. 6 illustrates, system 200 further includes additional solvent collection containers, compared to system 100, operatively paired with the two extract containers of system 200. Namely, system 200 includes a first solvent collection container 215, a solvent collection container 216, and a solvent collection container 217. System 200 additionally includes a solvent source container 220. The combined volume of first solvent collection container 215, solvent collection container 216, solvent collection container 217, and solvent source container 220 is operatively paired with the combined volume of first extract container 270a and second extract container 270b.

Figure 7:
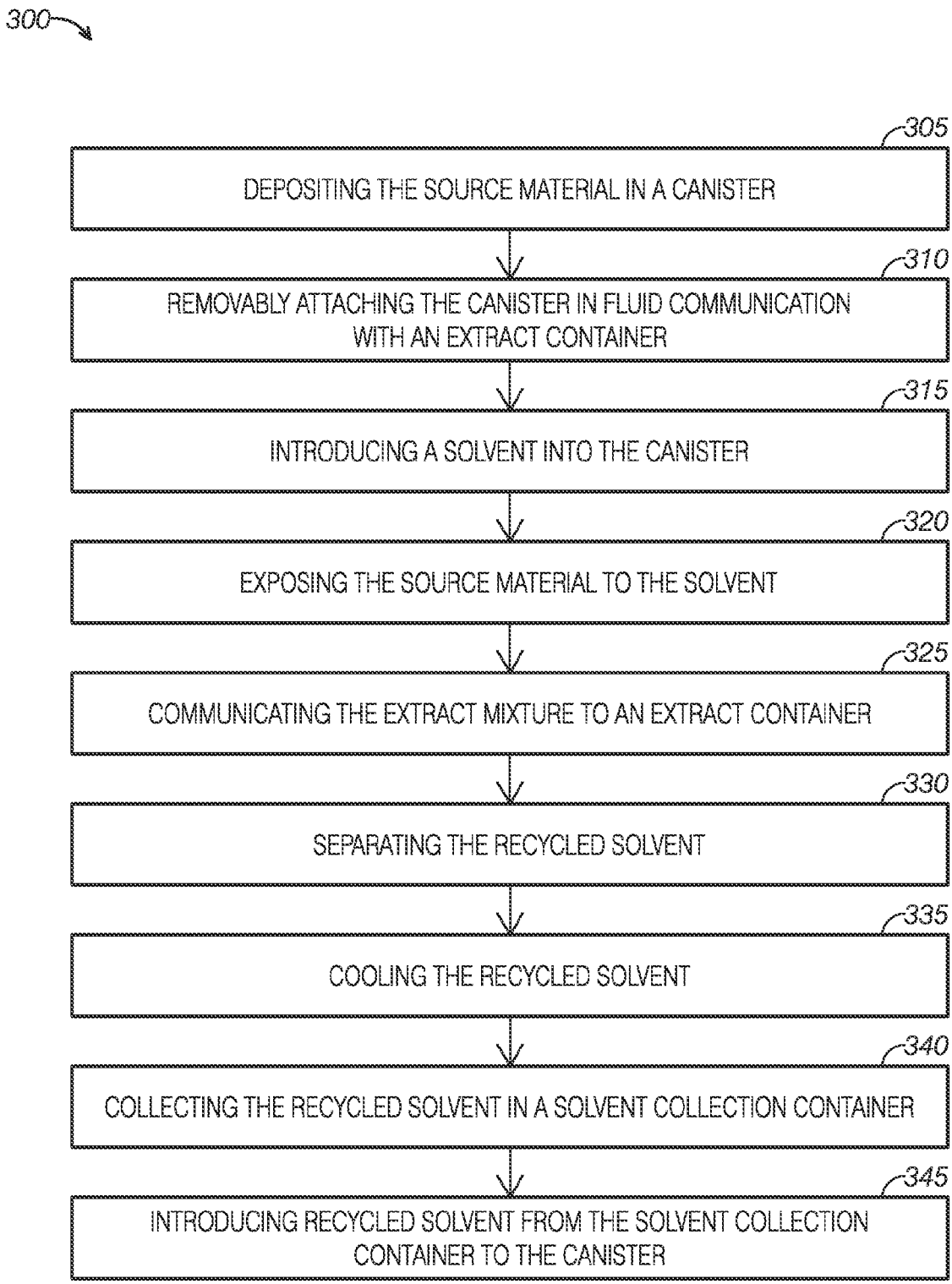
FIG. 7 is a flow diagram of a first example method for extracting solute from a source material.

With reference to FIG. 7, an example of a method for extracting solute from a source material, method 300, will now be described. Some of the steps of method 300 may be carried out using system 100, or other disclosed systems. Accordingly, the discussion of method 300 will reference system 100. Although this disclosure references system 100 in connection with method 300, method 300 is not required to be carried out on equipment similar to system 100, system 200, or other disclosed systems.

As FIG. 7 illustrates, method 300 includes depositing a source material including a solute in a canister at step 305, removably attaching the canister in fluid communication with an extract container at step 310, introducing a solvent into the canister at step 315, and exposing the source material to the solvent for a predetermined period of time at step 320, and communicating the extract mixture to an extract container at step 325. As FIG. 7 shows, method 300 further includes separating the recycled solvent at step 330, cooling the recycled solvent at step 335, collecting the recycled solvent in a solvent collection container at step 340, and introducing at least a portion of the recycled solvent from the solvent collection container to the canister at step 345.

As FIG. 7 illustrates, a source material including a solute is deposited in a canister at step 305. In some examples, the source material may define plant material from which essential oils may be extracted. For example, FIG. 2 illustrates first detachable canister 150 extracting essential oils from contained lavender 91.

In some examples, source material is deposited in a substantially fluid-tight canister configured to selectively receive solvent and selectively communicate extract mixture created therein. For example, first detachable canister 150 is substantially fluid tight in a closed configuration, but includes an input and output allowing fluid to be selectively input solvent and output created extract mixture.

In some examples, canisters may be configured to be detachably connected to an extraction system. In some such examples, source material may be deposited detachable canisters when detached from its associated extraction system. For example, first detachable canister 150, as shown in FIG. 2, defines a selectively openable canister configured to be selectively attached and detached from system 100. Accordingly, first detachable canister 150 allows a user to load it with source material when it is detached from system 100.

Some examples include a plurality of detachable canisters that may be individually attached and detached from extraction systems. In such examples, source material may be placed in one or more of the canisters while the other canisters continue normal operation. For example, system 100 includes three detachable canisters, first detachable canister 150, second detachable canister 163, and third detachable canister 164. First detachable canister 150, for example, could be removed and filled with source material as system 100 continues the extraction/reclamation process with second detachable canister 163 and third detachable canister 164.

Some examples may include a detachable canister interface allowing canisters to be easily detached and reattached. In some examples, detachable canister interfaces are configured to receive the canister to support the canister in fluid communication with the solvent source container and an extract container. For example, system 100 includes detachable canister system 140 that allows each of the detachable canisters to be attached and detached. As FIG. 1 shows, each of first detachable canister 150, second detachable canister 163, and third detachable canister 164 are placed in fluid communication with solvent source container 120 and extract container 170 when attached.

In some examples, detachable canister interfaces are configured to release the canister in response to user manipulation. In some examples, such as system 100, detachable canister interfaces allow users to attach and detach canisters without any specific tools or hardware.

As FIG. 7 shows, the canister containing the source material is removably attached in fluid communication with an extract container at step 310. By placing the canister in fluid communication with an extract container, the canister is able to communicate created extract mixture to the extract container. The extract container may then be used to collect extracted essential oils and separate recycled solvent from extracted essential oils collected therein.

As previously discussed, some examples include a plurality of simultaneously attached canisters. In some such examples, two or more of the simultaneously attached canisters may simultaneously be in fluid communication with a connected extract container. By placing each canister in fluid communication with the extract container, one or more canisters may simultaneously output contained extract mixture to a single connected extract container.

As seen in FIG. 7, solvent is introduced into the canister at step 315. In some examples, solvent is introduced into the canister by communicating, fluidly, solvent from a solvent source container to the canister. As previously discussed, some examples may include a plurality of detachable canisters. This disclosure contemplates introducing solvent into each canister independently, simultaneously with introducing solvent into one or more of the other canisters.

In some examples, introducing solvent into the canister includes pressurizing a charging portion of the solvent prior to introducing the solvent to the canister. In some examples, a charging portion of solvent may be pressurized when contained in a solvent compressor as one or more of the attached canisters contain an extracting portion of solvent being used to extract solute from the source material. In system 100, for example, a user may pressurize a charging portion of solvent in solvent compressor 130, designated for first detachable canister 150, as second detachable canister 163 and third detachable canister 164 each contain an extracting portion of solvent and are extracting solute therewith.

Pressurizing the solvent is often a time-consuming process. Extracting solute in the canisters is also often time consuming. As a result, the parallelism afforded by pressurizing solvent as other attached canisters continue the extraction process efficiently streamlines the pressurizing and extracting steps of disclosed methods.

In some examples, some or all of the solvent introduced into the canister may include recycled solvent reclaimed from a previous cycle of the disclosed methods. As will be discussed more below, some examples include a reclamation methodology that operates alongside disclosed extraction methodologies. By using reclaimed solvent, disclosed methods may use solvent particularly efficiently. In some examples, solvent may automatically be collected and reintroduced. In some examples, solvent collection and reintroduction may occur simultaneously with other steps of the disclosed methods. Some examples may collect solvent in a plurality of solvent collection containers, such as system 200.

In some examples, introducing the solvent may include passing the solvent through a solvent filter as it passes from solvent source container 120 to solvent compressor 130. In some examples, the solvent filter may define a 13-X molecular sieve configured for membrane filtration of the solvent as it passes from solvent source container 120 to solvent compressor 130.

As FIG. 7 illustrates, the source material is exposed to the solvent for a predetermined period of time at step 320. The predetermined period of time in which the source material exposed is selected to substantially maximize the purity of extracted solvent. In some examples, the source material and solvent are exposed to heat and pressure conditions that may increase the efficiency with which solute is extracted from source materials. Soaking the source material in the solvent within an associated canister for 3-5 minutes has been found to be a surprisingly effective method exposing the source material to the solvent. In some examples, following the soak with a hydrocarbon wash of the associated canister has been found to result in a particularly high quality, pure product in subsequent extraction steps performed with that particular canister.

For example, it may be desirable to extract solute from source materials at both high temperatures while solvent remains in a liquid state. This disclosure contemplates both heating the solvent when it is exposed to the source material and pressurizing the contained volume of solvent to a selected pressure to maintain the solvent in a liquid state when heated. By manipulating the pressure and temperature of the solvent, disclosed methods may extract solute at a higher purity and greater yield per unit of source material than conventional extraction methods.

As shown in FIG. 7, the created extract mixture is communicated to an extract container, the extract container in fluid communication with the extract mixture, at step 325. By communicating the extract mixture to the extract container, the extract container may collect and store extract for future use. In some examples, extract containers may be removed to use or store collected extract.

In some examples, the extract container may define a negative pressure prior to receiving extract mixture. The created extract mixture may be communicated to the extract container by opening a fluid communicative path between a canister containing created extract mixture and the extract container. For example, system 100 allows a user to manipulate the output valve of detachable canister system 140 associated with a container containing created extract mixture to open a fluid line between the associated canister and extract container 170.

As FIG. 7 shows, the recycled solvent is separated at step 330. Separating the recycled solvent may include including heating the container to evaporate the recycled solvent. Heating the container to evaporate the recycled solvent may include heating the container to a solvent extraction temperature. The solvent extraction temperature of the container may be greater than a boiling point of the solvent and less than a boiling point of the solute. By raising the temperature of the extract mixture above the solvent's boiling point and below the boiling point of essential oils, the solvent is separated from the extract mixture as a gas. The evaporated solvent may output independently of any contained essential oil or other extract.

In some examples, users may discard the contents of an extract container after evaporating the recycled solvent. In some examples, the contents of the extract container may include odorants or other impurities that may remain in the extract container after evaporating the recycled solvent. As a result, the recycled solvent may have increased purity compared the input solvent. Users may discard these impurities to ensure that they do not end up in any end product produced by subsequent extraction/reclamation cycles.

In some examples, the solvent may define butane. In such examples, heating the container to evaporate the solvent may include raising the temperature within the container above butane's sea level boiling point of about 30.8 degrees Fahrenheit while maintaining the temperature within the container to below typical boiling points of water and/or essential oils.

In some examples, separating the recycled solvent includes receiving the evaporated recycled solvent through a container output opening. In some examples, one or more fluidly-connected pumps may suck evaporated recycled solvent through the container output opening. As previously discussed, this disclosure contemplates extract containers that remain structurally stable at negative pressures. Attached pumps may be configured to extract substantially all of the evaporated recycled solvent contained in an extract container and leave the extract container with a negative pressure. By leaving the extract container with a negative pressure, the pumps additionally prepare the extract container to later receive additional extract mixture from one or more attached canisters.

In some examples, the evaporated recycled solvent is positioned above any liquid extract mixture contained in the extract container. For example, extract container 170 includes container output 174 positioned near the top of extract container 170 and above any contained extract. In some examples, users may periodically empty the extract to ensure that the container output opening remains above any contained extract. For example, the extract container may be removed and contained extract may be stored in an alternative container. To ensure the container output opening remains above the contained extract, the container may be periodically emptied prior to the extract container accumulating sufficient extract to reach the container output opening.

As seen in FIG. 7, the recycled solvent is cooled at step 335. In some examples, as is seen in system 100, the recycled solvent is thermally coupled with a solvent for a portion of the time after the recycled solvent leaves an extract container. In some examples, the recycled solvent is cooled prior to collecting the recycled solvent in the solvent collection container.

In some examples, the recycled solvent is directed through a solvent collection line and the recycled solvent is thermally coupled with a coolant along at least a portion of the solvent collection line. In some examples, the coolant is directed through a coolant line which is engaged with the solvent collection line over at least a portion of its length. For example, coolant line 109 is configured to carry coolant and is engaged with solvent collection line 190 through first condenser column 107. Because solvent collection line 190 is engaged with coolant line 109 and each line is constructed of thermally conductive material through first condenser column 107, coolant line 109 is thermally coupled with solvent collection container 115 through first condenser column 107.

In some examples, the coolant is directed through a fluid-transmissive coolant loop. The coolant loop may be configured to both output and receive coolant from the coolant line. For example, FIG. 1 illustrates an example coolant loop line, coolant loop line 113, which is configured to output and receive coolant from the coolant line at a single junction.

The coolant loop may additionally or alternatively define an expansion valve configured to expand and cool the coolant in the coolant loop. Additionally or alternatively, the coolant loop line may be engaged with the coolant line over at least a portion of its length, thereby thermally coupling the coolant loop and the coolant line over a portion of their lengths. By expanding the coolant in the coolant loop, the coolant loop includes a coolant that may be cooler than the coolant in the primary coolant line. By thermally coupling the coolant loop with the coolant line, the coolant loop may, in effect, cool the coolant in the coolant line.

FIG. 1 illustrates an example fluid circuit including a coupled coolant loop and coolant line. As previously discussed, coolant line 109 is thermally coupled with solvent collection line 190. As FIG. 1 shows, coolant line 109 is connected to both input and output to coolant loop line 113 at a single junction. Accordingly, system 100 is configured to allow coolant to be directed through coolant line 109 and is configured to direct at least a portion of the coolant in the coolant line 109 through coolant loop line 113.

As FIG. 1 shows, coolant loop line 113 includes first expansion valve 111 which is configured to expand and cool coolant contained in coolant loop line 113 prior to directing coolant in coolant loop line 113 through second condenser column 108. As previously discussed, coolant loop line 113 is thermally engaged with coolant line 109 through second condenser column 108. By expanding coolant contained in coolant loop line 113 and thermally coupling coolant loop line 113 and coolant line 109 immediately downstream of this expansion, coolant loop line 113 is configured to cool coolant line 109 through second condenser column 108.

As illustrated in FIG. 7, the recycled solvent is collected in a solvent collection container in fluid communication with the extract container at step 340. In some examples, the solvent collected by the solvent collection container is fluidly communicated from an extract container. In some examples, the recycled solvent is cooled to a liquid state prior to collection in the solvent collection container.

In some examples, collected solvent is automatically output from a solvent collection container upon the solvent collection container collecting a maximum amount of collected solvent. In some examples, the automatically output collected solvent is input into a solvent source container in fluid communication with the associated solvent collection container. For example, solvent collection container 115 is configured to output collected recycled solvent to solvent source container 120 upon collecting a maximum quantity of collected recycled solvent.

In some configurations, solvent collection containers are configured to communicate collected solvent upon exceeding its storage capacity. In other examples, solvent collection containers are configured to automatically communicate collected solvent upon the collected solvent reaching the end of a collection container output positioned within the solvent collection container.

In some examples, collecting the recycled solvent includes displacing, with a pump, evaporated recycled solvent from the extract container to the solvent collection container. For example, first pump 101 and second pump 102 are configured to, in certain configurations, draw collected solvent from extract container 170 to solvent collection container 115.

In some examples, collecting the recycled solvent includes displacing, with a pump, recycled solvent from solvent collection containers to solvent source containers or canisters. For example, first pump 101 and second pump 102 are configured to, in certain configurations, draw collected solvent from solvent collection container 115 to solvent source container 120. First pump 101 and second pump 102 may be further configured to draw reclaimed solvent in solvent source container 120 to one or more connected detachable canisters containing source material.

In some examples collecting the recycled solvent includes sealing the solvent collection container when the solvent collection container contains at least a portion of the recycled solvent and detaching the solvent collection container. In some examples, the solvent collection container may be sealed when it contains a predetermined quantity of the recycled solvent. Upon being sealed, solvent source containers containing reclaimed solvent may be detached and stored for later use. By allowing removal and storage of solvent collection containers and/or solvent source containers, users may store purified, reclaimed solvent for use in future use. Because of the disclosed purification features, recycled solvent may be of a greater purity than many commercially available solvents.

In some examples, recycled solvent is collected in an additional solvent collection container in fluid communication with the extract container. Additional solvent collection containers may be useful, for example, when additional or larger extract containers are used, as they may provide the increased headroom required when using additional or larger extract containers. In some such examples, the second solvent container may be operatively paired with the extract container. In some examples, solvent containers and extract containers may be operatively paired by defining a substantially similar total solvent container volume that is consistent with or equal to the total extract container volume. System 200, for example, includes a supplemental extract container paired with a supplemental solvent collection container.

As shown in FIG. 7, recycled solvent from the solvent collection container is introduced into the canister at step 345. In some examples, introducing at least a portion of the recycled solvent from the solvent collection container to the canister includes directing at least a portion of the recycled solvent from the solvent collection container to a solvent source container prior to reaching a canister. By reintroducing recycled solvent, disclosed methods efficiently re-use reclaimed solvent from previous extraction/reclamation cycles. Because used solvent is not simply discarded, disclosed methods provide robust economic and ecological efficiency.

In some examples, recycled solvent contained in solvent collection container is displaced into the solvent source container upon the solvent collection container collecting a predetermined quantity of recycled solvent. In some examples, the solvent collection container is configured to introduce such received recycled solvent to the canister in future styles, instead of adding additional solvent. For example, solvent source container 120 is configured to direct new solvent and/or solvent received from solvent collection container 115 to detachable canister system 140.

Figure 8:
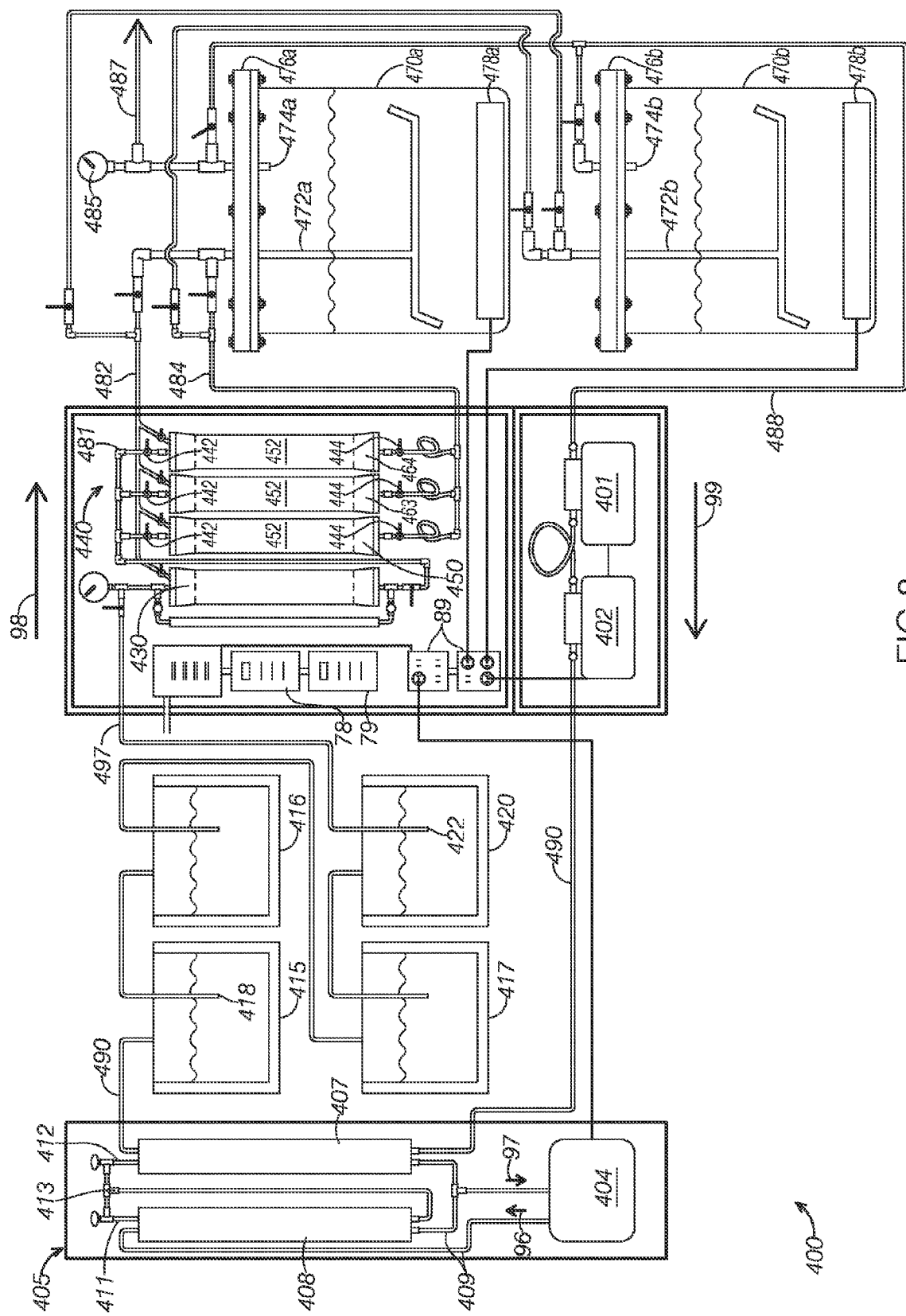
FIG. 8 is a schematic view of a third example of a system for extracting solute from a source material.

Turning attention to FIG. 8, a third example of a system for extracting solute from a source material, system 400, will now be described. System 400 includes many similar or identical features to systems 100 and 200. Thus, for the sake of brevity, each feature of system 400 will not be redundantly explained. Rather, key distinctions between system 400 and systems 100 and 200 will be described in detail and the reader should reference the discussion above for features substantially similar between the three systems.

As FIG. 8 shows, similar to system 200, system 400 includes more than one extract container. For example, system 400 includes both a first extract container 470a and a second extract container 470b. It will be appreciated that second extract container 470b has a substantially similar configuration to first extract container 470a, and each of extract containers 470a and 470b have a substantially similar configuration to extract container 170 (i.e., having a container inputs 472a and 472b, a container outputs 474a and 474b, a lids 476a and 476b, and a heating elements 478a and 478b).

In this example, second extract container 470b is coupled to output line 488 downstream of first extract container 470a, however, differently from system 200, second extract container is coupled directly to detachable canister system 240 for collection of the extract mixture. In other words, first extract container 270a and second extract container 270b are each distinctively coupled to detachable canister system 240 for collection of the extract mixture. Specifically, each of first extract container 470a and second extract container 470b are coupled to overflow line 482 for collection over overflow solvent and extract mixture line 484 for collection of the extract mixture. Thus, overflow line 482 and extract mixture line 484 are split pathway lines directed by alternate operation of valves.

Accordingly, using system 400, the first and second extract containers can be releasably coupled to the canisters so that one can collect a first portion of the extract mixture and be sealed for storage and later use, while the other extract container collects a second portion of the extract mixture. Further, the first extract container can be heated to evaporate the solvent from the extract mixture (i.e., a first portion of the extract mixture). The first extract container can then be sealed and uncoupled from the system for storage of the purified solute, while the second extract container collects the remaining extract mixture (i.e., a second portion of the extract mixture).

This system has the advantage that the canisters can be switched out with canisters having a different source material or the source material within the canisters can be changed without disruption to the flow of the system. In some examples, the resulting portions of extract mixture can be isolated in the extract containers and later distilled. In other examples, the resulting portions of the extract mixture can be alternatingly purified (via heating within the extract container to evaporate the solvent) while the other extract container continues to collect solvent, and the extract container containing the purified solute and be sealed and stored. It will be appreciated that the first and second extract containers can alternatively simultaneously receive overflow solvent and/or extract mixture.

As FIG. 8 illustrates, system 400 further includes additional solvent collection containers, compared to system 100, operatively paired with the two extract containers of system 400. Namely, system 400 includes a first solvent collection container 415, a solvent collection container 416, and a solvent collection container 417. System 400 additionally includes a solvent source container 420. The combined volume of first solvent collection container 415, solvent collection container 416, solvent collection container 417, and solvent source container 420 is operatively paired with the combined volume of first extract container 470a and second extract container 470b. It will be appreciated that additional extraction containers and/or solvent collection containers can be added to the system in order to scale the system as desired.

Figure 9:
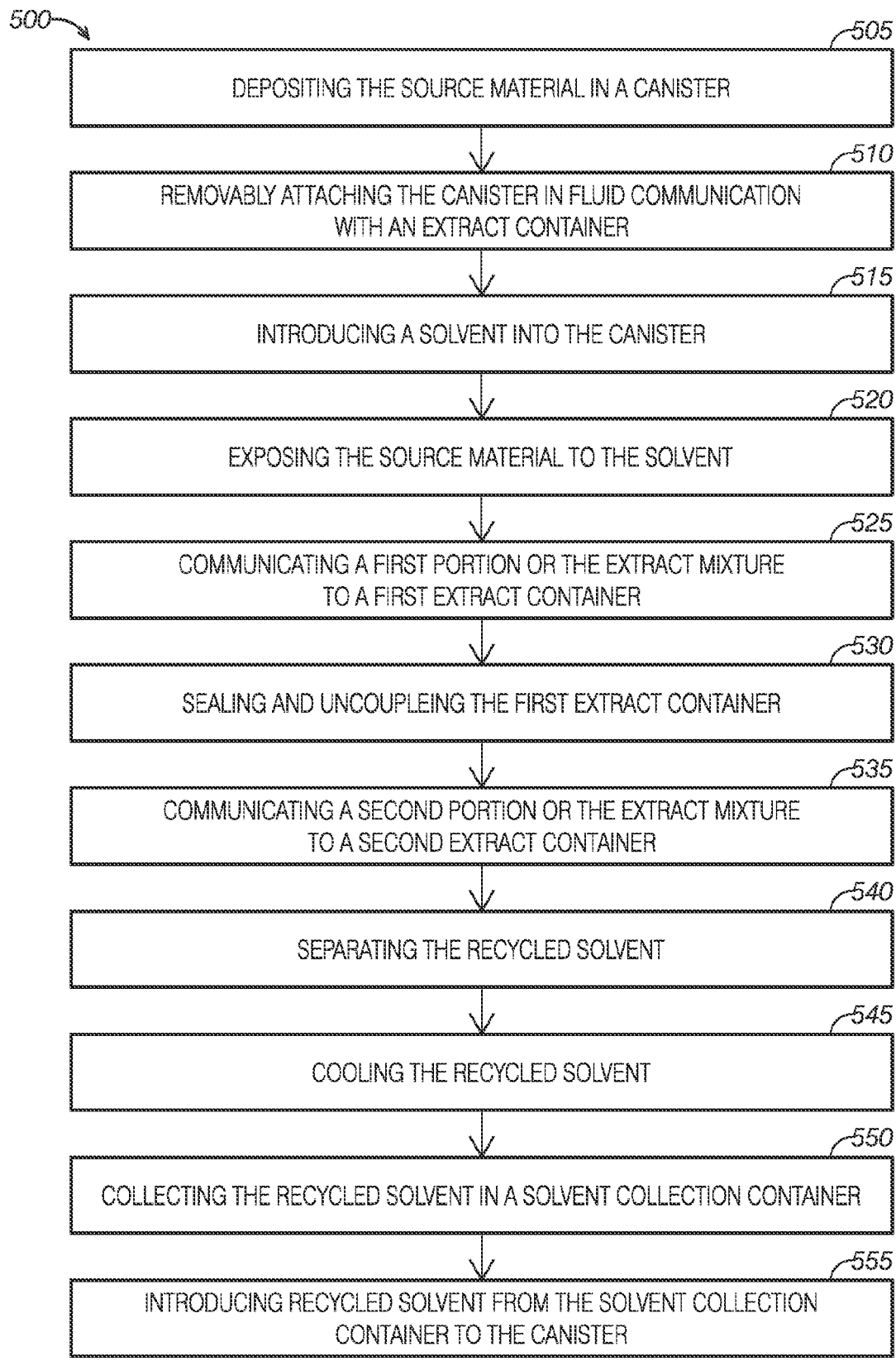
FIG. 9 is a flow diagram of a second example method for extracting solute from a source material.

FIG. 9 shows an example method 500, which is a method for extracting solute from a source material using system 400. Method 500 includes many similar or identical steps to method 300. Thus, for the sake of brevity, each step of method 500 will not be redundantly explained. Rather, key distinctions between methods 500 and 300 will be described in detail and the reader should reference the discussion above for features substantially similar between the two methods.

As described above, some of the steps of method 500 may be carried out using system 100, or other disclosed systems. Accordingly, the discussion of method 500 will reference system 100. Although this disclosure references system 100 in connection with method 500, method 500 is not required to be carried out on equipment similar to system 100, system 200, system 300, or other disclosed systems.

As FIG. 9 illustrates, method 500 includes depositing a source material including a solute in a canister at step 505, removably attaching the canister in fluid communication with an extract container at step 510, introducing a solvent into the canister at step 515, and exposing the source material to the solvent for a predetermined period of time at step 520, similar to steps 305-320 of method 300. Differently from method 300, at step 525 a first portion of the extract mixture is communicated to the first extract container, the first extract container is sealed and uncoupled from the canister at step 530, and a second portion of the extract mixture is communicated to the second extract container at step 535. As FIG. 9 shows, method 500 further includes separating the recycled solvent at step 540, cooling the recycled solvent at step 545, collecting the recycled solvent in a solvent collection container at step 550, and introducing at least a portion of the recycled solvent from the solvent collection container to the canister at step 555, which are substantially similar to steps 330-340 of method 300.

As described above and shown in FIGS. 8 and 9, a first portion of the extract mixture is communicated to first extract container 470a, the first extract container being in fluid communication with detachable canister system 440, at step 525. By communicating the first portion of the extract mixture to the first extract container via a first pathway in extract mixture line 484, the extract container may collect the extract mixture. Extract container 470a can then be sealed and detached from system 400 to store the first portion of the extract mixture for future use, at step 530. A second portion of the extract mixture can then be communicated to and collected in second extract container 470b via a second pathway in extract mixture line 484, at step 535. It will be appreciated that the first portion of the extract mixture in the first extract container can be distilled via heating to separate the solvent from the solute prior to sealing and uncoupling of the first extract container for storage of the purified solute rather than storage of the extract mixture.

In some examples, the one or more of the extract containers may define a negative pressure prior to receiving extract mixture. The extract mixture may be communicated to the extract containers by opening a fluid communicative path between a canister containing extract mixture and the extract container. For example, system 100) allows a user to manipulate the output valve of detachable canister system 140 associated with the extract containers to alternatively or simultaneously open a fluid line (i.e., extract mixture line 484) between the associated canister and extract container 170a and 470b.

Figure 10:
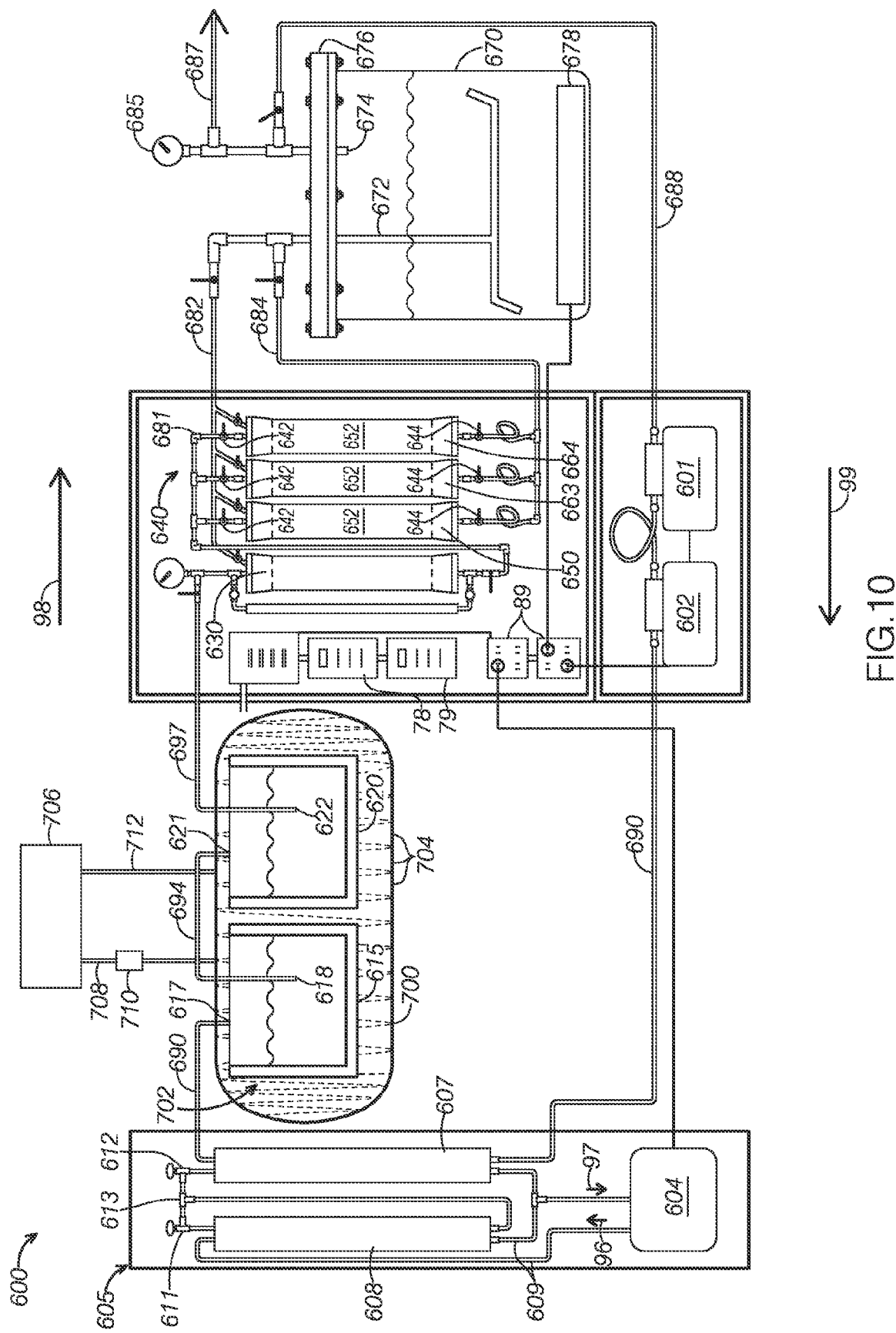
FIG. 10 is a schematic view of a fourth example of a system for extracting solute from a source material.

Turning attention to FIG. 10, a fourth example of a system for extracting solute from a source material, system 600, will now be described. System 600 includes many similar or identical features to systems 100, 200, and 400. Thus, for the sake of brevity, each feature of system 600 will not be redundantly explained. Rather, key distinctions between system 600 and systems 100, 200, and 400 will be described in detail and the reader should reference the discussion above for features substantially similar between the four systems.

As FIG. 10 shows, similar to system 100, system 600 includes system 100 includes a solvent collection container 618, a solvent source container 620, a solvent compressor 630, a detachable canister system 640, an extract container 670, a first pump 601, a second pump 602, a condensing system 605, and a solvent collection container 615. System 100 additionally includes various valves and fluid lines (defining pipes) that control the flow of fluids through system 100 during operation. It will be appreciated that the above listed components of system 600 have a substantially similar configuration and function to a solvent collection container 118, solvent source container 120, a solvent compressor 130, a detachable canister system 140, an extract container 170, a first pump 101, a second pump 102, a condensing system 105, and a solvent collection container 115, respectively, of system 100.

Differently than system 100, system 600 further includes a cooling mechanism 700. Cooling mechanism 700 is coupled to solvent collection container 618 and solvent source container 620. In alternate examples, the cooling mechanism can be coupled to one of the solvent collection container and the solvent source container. The cooling mechanism is configured to cool the solvent (e.g., the recycled solvent) within the solvent source container. In one example, the cooling mechanism encloses the solvent collection container and the solvent source container. Further, in one example, the cooling mechanism is configured to maintain the solvent at a temperature below a boiling point of the solvent.

Figure 11:
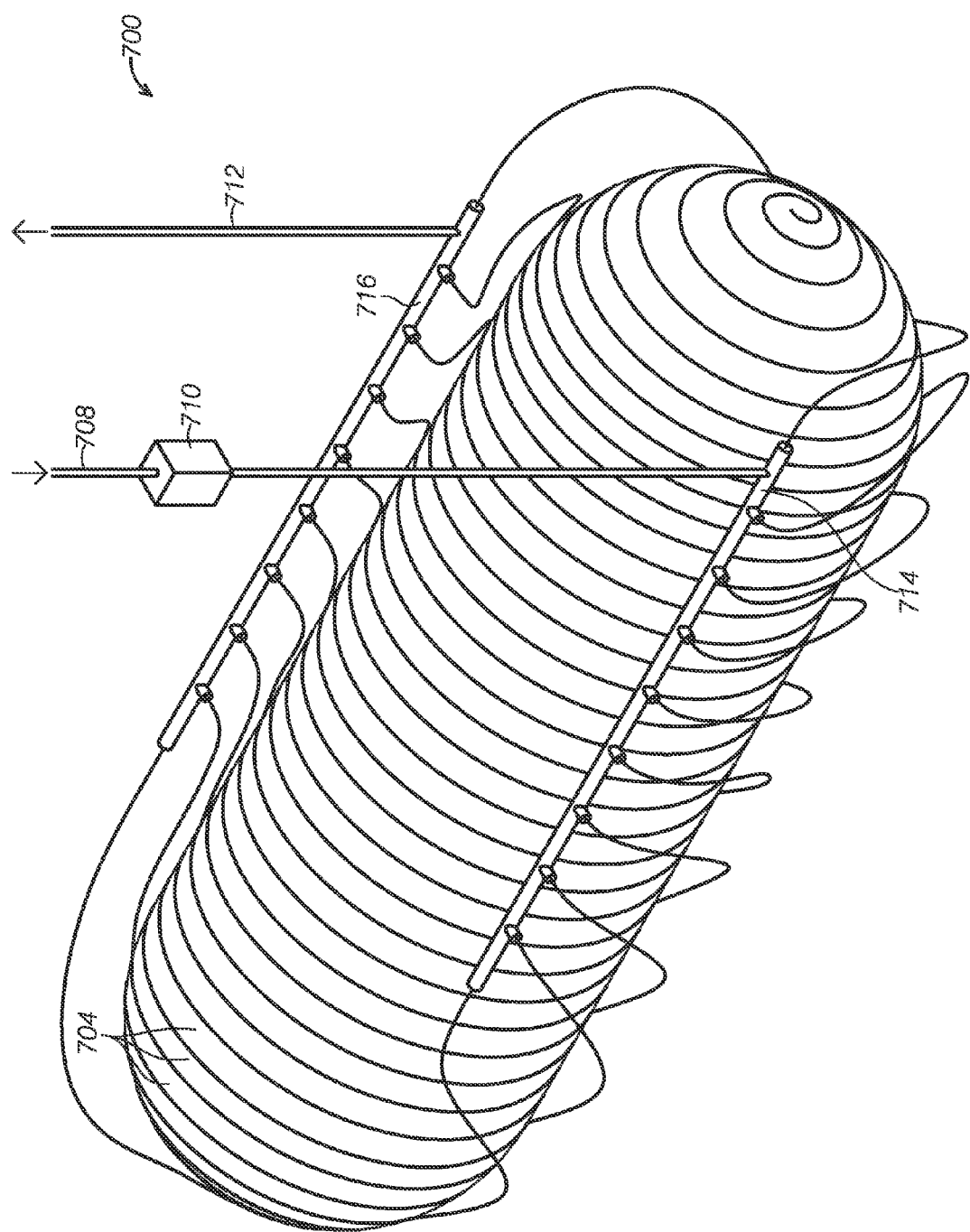
FIG. 11 is an isometric view of a cooling mechanism for the fourth example system for extracting solute from a source material shown in FIG. 10.

As shown in FIGS. 10 and 11, cooling mechanism 700 includes a chamber 702 in which solvent collection container 618 and solvent source container 620 are disposed. Chamber 702 is enclosed by a plurality of coiled freezing tubes 704. Freezing tubes 704 are coupled to a compressor pump 706 via an intake line 708 including an expansion valve 710 and an outtake tube 712. As shown in FIG. 11, intake line 708 is coupled to an intake manifold 714 and outtake line 712 is coupled to an exhaust manifold 716.

Accordingly, the compressor pump is fluidly coupled to the cooling mechanism and is configured to deliver and/or circulate a coolant through the freezing tubes in order to maintain the solvent and/or recycled solvent within the desired temperature range. Maintaining the solvent at a low temperature has the advantage that it remains in a liquid form during storage.

Figure 12:
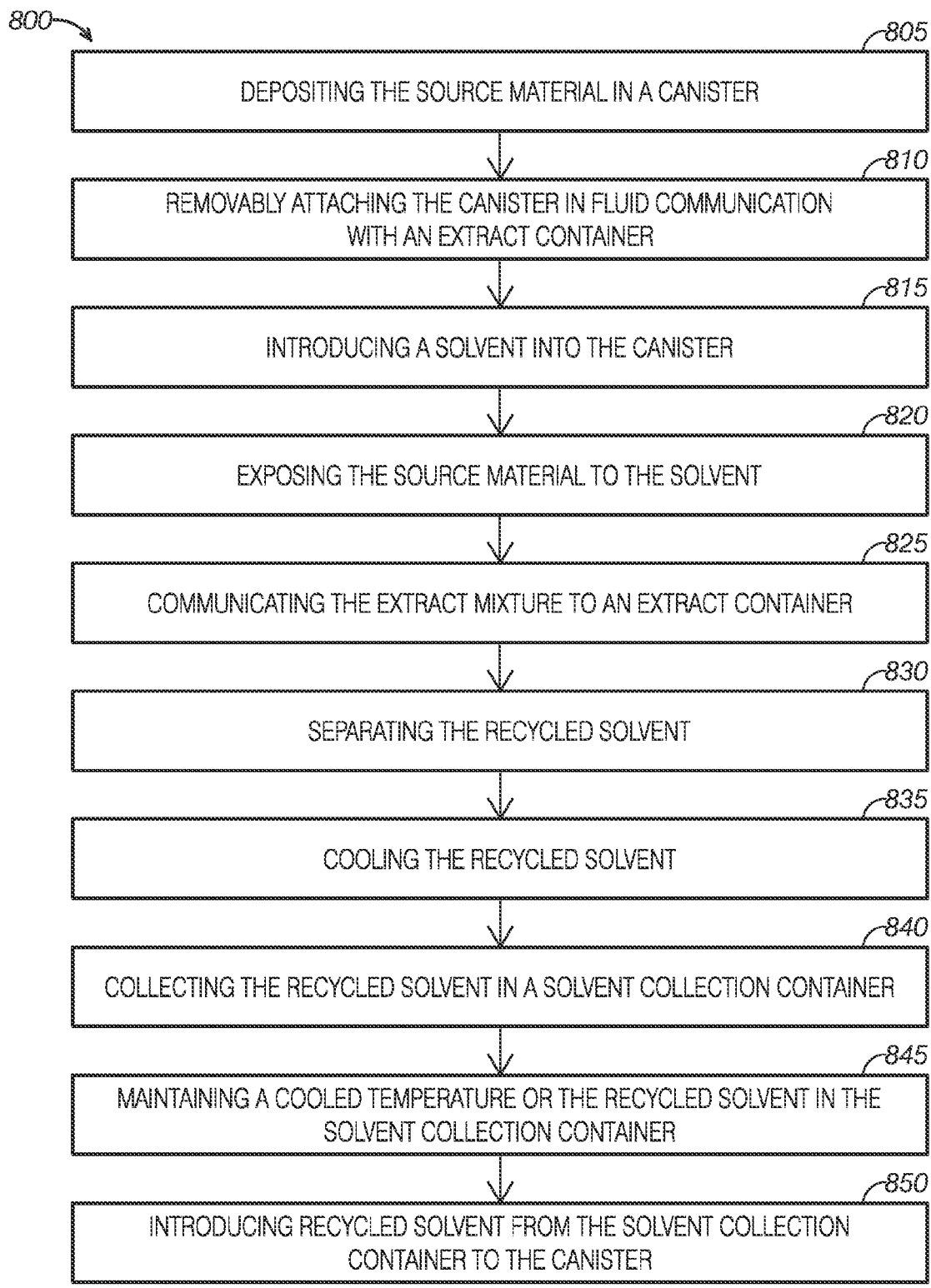
FIG. 12 is a flow diagram of a third example method for extracting solute from a source material.

FIG. 12 shows an example method 800, which is a method for extracting solute from a source material using system 600. Method 800 includes many similar or identical steps to methods 300 and 500. Thus, for the sake of brevity, each step of method 800 will not be redundantly explained. Rather, key distinctions between methods 800 and methods 300 and 500 will be described in detail and the reader should reference the discussion above for features substantially similar between the three methods.

As described above, some of the steps of method 800 may be carried out using system 100, or other disclosed systems. Accordingly, the discussion of method 800 will reference system 100. Although this disclosure references system 100 in connection with method 800, method 800 is not required to be carried out on equipment similar to system 600, system 100, system 200, system 300, or other disclosed systems.

As FIG. 12 illustrates, method 800 includes depositing a source material including a solute in a canister at step 805, removably attaching the canister in fluid communication with an extract container at step 810, introducing a solvent into the canister at step 815, exposing the source material to the solvent for a predetermined period of time at step 820, communicating the extract mixture to an extract container at step 825, separating the recycled solvent at step 830, cooling the recycled solvent at step 835, and collecting the recycled solvent in a solvent collection container at step 840, substantially similar to steps 305-340 of method 300.

Differently from method 300, at step 845, a cooled temperature of the recycled solvent in maintained in the solvent collection container. As described above, a cooling mechanism coupled to the solvent source container, such as cooling mechanism 700, can be used to maintain the recycled solvent at a desired temperature range. In one specific example, the solvent is butane and the desired temperature range is below a boiling point of butane. As FIG. 12 shows, method 800 further includes introducing the recycled solvent from the solvent collection container to the canister at step 850, which is substantially similar to step 345 of method 300.

As described above and shown in FIGS. 8 and 9, a first portion of the extract mixture is communicated to first extract container 470*a*, the first extract container being in fluid communication with detachable canister system 440, at step 525. By communicating the first portion of the extract mixture to the first extract container via a first pathway in extract mixture line 484, the extract container may collect the extract mixture. Extract container 470*a* can then be sealed and detached from system 400 to store the first portion of the extract mixture for future use, at step 530. A second portion of the extract mixture can then be communicated to and collected in second extract container 470*b* via a second pathway in extract mixture line 484, at step 535.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A method for extracting solute from a source material, the method comprising:
    depositing the source material having a solute in a canister;
    introducing a solvent into the canister;
    exposing the source material to the solvent to create an extract mixture having the solute in solution with the solvent;
    fluidly communicating the extract mixture to one or more extract containers, the one or more extract containers being in fluid communication with the canister;
    separating the solute from the extract mixture to define a recycled solvent by heating the one or more extract containers to evaporate the recycled solvent;
    collecting the recycled solvent in a solvent collection container in fluid communication with the one or more extract containers; and
    cooling the recycled solvent within the solvent collection container.

2. The method for extracting solute from a source material of claim 1, wherein the one or more extract containers comprise a first extract container and a second extract container, and
    the canister is releasably coupled to each of the first extract container and the second extract container.

3. The method for extracting solute from a source material of claim 2, further comprising selectively coupling the first extract container to the canister for fluidly receiving and collecting a first portion of the extract solution.

4. The method for extracting solute from a source material of claim 3, further comprising selectively uncoupling the first extract container from the canister and sealing the first extract container for storage of one or more of the first portion of the extract solution and a first portion of the purified solute.

5. The method for extracting solute from a source material of claim 4, further comprising selectively coupling the second extract container to the canister for fluidly receiving and collecting a second portion of the extract solution.

6. The method for extracting solute from a source material of claim 5, further comprising selectively uncoupling the second extract container from the canister and sealing the second extract container for storage of one or more of the second portion of the extract solution and a second portion of the solute.

7. The method for extracting solute from a source material of claim 1, wherein heating the one or more of extract containers to evaporate the solvent comprises heating the one or more extract containers to a solvent extraction temperature, the solvent extraction temperature of the container being greater than a boiling point of the solvent and less than a boiling point of the solute.

8. The method for extracting solute from a source material of claim 7, wherein collecting the recycled solvent comprises displacing, with a pump, the recycled solvent in vapor form from the one or more extract containers to the solvent collection container.

9. The method for extracting solute from a source material of claim 1, wherein the solvent storage container further comprises a cooling mechanism coupled to the solvent storage container for cooling the recycled solvent.

10. The method for extracting solute from a source material of claim 9, wherein the cooling mechanism comprises a coiled freezing tube fluidly coupled to a compressor pump and configured to receive a coolant.

11. The method for extracting solute from a source material of claim 10, further comprising circulating the coolant through the coiled freezing tube to cool and maintain a temperature of the recycled solvent.

12. The method for extracting solute from a source material of claim 1, wherein the recycled solvent is maintained a temperature below a boiling point of the solvent.

13. The method for extracting solute from a source material of claim 1, wherein the source material is a plant material and the solute is an essential oil.

14. The method for extracting solute from a source material of claim 1, wherein the solvent is butane.

15. A method for extracting a solute from a source material, the method comprising:
- exposing the source material in a canister to a solvent to create an extract mixture having the solute in solution with the solvent;
- communicating the extract mixture to one or more extract containers, the one or more extract containers in fluid communication with the canister;
- separating the solute from the extract mixture to define an evaporated solvent by, heating the one or more extract containers to evaporate the solvent;
- cooling the evaporated solvent to a temperature below the boiling point of the solvent to define a recycled liquid solvent;
- collecting the recycled liquid solvent in a solvent collection container in fluid communication with the one or more extract containers, the recycled liquid solvent being stored in the solvent collection container as a liquid; and
- maintaining a temperature of the recycled liquid solvent within the solvent collection container.

16. The method for extracting solute from a source material of claim 15, wherein the temperature of the recycled liquid solvent within the solvent collection container is maintained via a cooling mechanism coupled to the solvent collection container.

17. The method for extracting solute from a source material of claim 16, wherein the cooling mechanism comprises a coiled freezing tube configured to receive and circulate a coolant for maintaining a temperature of the recycled liquid solvent below a boiling point of the solvent.

18. A method for extracting solute from a source material, the method comprising:
- depositing the source material having a solute in a canister;
- introducing a solvent into the canister;
- exposing the source material to the solvent to create an extract mixture having the solute in solution with the solvent;
- fluidly communicating the extract mixture to one or more extract containers, the one or more extract containers being in fluid communication with the canister;
- separating the solute from the extract mixture to define a recycled solvent by heating the one or more extract containers to evaporate the recycled solvent; and
- collecting the recycled solvent in a solvent collection container in fluid communication with the one or more extract containers,
- wherein the one or more extract containers comprise a first extract container and a second extract container, and
- wherein the canister is releasably coupled to each of the first extract container and the second extract container.

19. The method for extracting solute from a source material of claim 18, further comprising selectively coupling the first extract container to the canister for fluidly receiving and collecting a first portion of the extract solution, and
- selectively uncoupling the first extract container from the canister and sealing the first extract container for storage of one or more of the first portion of the extract solution and a first portion of the solute.

20. The method for extracting solute from a source material of claim 19, further comprising selectively coupling the second extract container to the canister for fluidly receiving and collecting a second portion of the extract solution, and
- selectively uncoupling the second extract container from the canister and sealing the second extract container for storage of one or more of the second portion of the extract solution and a second portion of the solute.

* * * * *

(12) INTER PARTES REVIEW CERTIFICATE (3270th)

United States Patent
Wasserman et al.

(10) Number: US 9,587,203 K1
(45) Certificate Issued: Oct. 17, 2023

(54) METHODS FOR EXTRACTING SOLUTE FROM A SOURCE MATERIAL

(71) Applicants: Jason Wasserman; Jess Ordower; Samual Decker

(72) Inventors: Jason Wasserman; Jess Ordower; Samual Decker

(73) Assignee: GENE POOL TECHNOLOGIES, INC.

Trial Number:

IPR2022-00625 filed Feb. 21, 2022

Inter Partes Review Certificate for:

Patent No.: 9,587,203
Issued: Mar. 7, 2017
Appl. No.: 14/834,872
Filed: Aug. 25, 2015

The results of IPR2022-00625 are reflected in this inter partes review certificate under 35 U.S.C. 318(b).

INTER PARTES REVIEW CERTIFICATE
U.S. Patent 9,587,203 K1
Trial No. IPR2022-00625
Certificate Issued Oct. 17, 2023

AS A RESULT OF THE INTER PARTES REVIEW PROCEEDING, IT HAS BEEN DETERMINED THAT:

Claims 2-6 and 18-20 are found patentable.

Claims 1 and 7-17 are cancelled.

\* \* \* \* \*